(12) United States Patent
Shiokawa

(10) Patent No.: US 11,494,133 B2
(45) Date of Patent: Nov. 8, 2022

(54) IMAGE FORMING SYSTEM INCLUDING IMAGE FORMING APPARATUS CONFIGURED TO OUTPUT VOICE GUIDANCE TO A USER DURING TRANSFER OF A JOB, AND METHOD FOR CONTROLLING IMAGE FORMING APPARATUS

(71) Applicant: KONICA MINOLTA, INC., Tokyo (JP)

(72) Inventor: Yukiharu Shiokawa, Akiruno (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/361,127

(22) Filed: Jun. 28, 2021

(65) Prior Publication Data
US 2022/0019388 A1    Jan. 20, 2022

(30) Foreign Application Priority Data
Jul. 14, 2020  (JP) .............................. JP2020-120410

(51) Int. Cl.
*G06F 3/12* (2006.01)

(52) U.S. Cl.
CPC ............ *G06F 3/1206* (2013.01); *G06F 3/126* (2013.01); *G06F 3/1284* (2013.01)

(58) Field of Classification Search
None
See application file for complete search history.

(56) References Cited

U.S. PATENT DOCUMENTS

| | | | |
|---|---|---|---|
| 6,873,806 B2* | 3/2005 | Kobayashi | G03G 15/5016 399/80 |
| 7,610,411 B2* | 10/2009 | Umekage | G06F 3/1214 713/323 |
| 9,632,733 B2* | 4/2017 | Laurin | H04W 4/80 |
| 2017/0123741 A1* | 5/2017 | Duran, Jr | G06F 3/1226 |
| 2021/0263687 A1* | 8/2021 | Tran | G06F 3/1232 |

FOREIGN PATENT DOCUMENTS

| | | |
|---|---|---|
| JP | H1139106 A | 2/1999 |
| JP | 2019191494 A | 10/2019 |

* cited by examiner

*Primary Examiner* — Paul F Payer
(74) *Attorney, Agent, or Firm* — Holtz, Holtz & Volek PC

(57) ABSTRACT

In a system including first and second image forming apparatuses, a hardware processor of the first image forming apparatus guides a user by voice on information about execution of a job, and sets the job based on voice input from the user. When the job cannot be executed by a printer, the hardware processor of the first image forming apparatus transfers the set job to the takeover-destination second image forming apparatus through a network. A hardware processor of the second image forming apparatus that has received the set job takes over and performs the guidance for the user by voice.

17 Claims, 7 Drawing Sheets

IMAGE FORMING SYSTEM INCLUDING IMAGE FORMING APPARATUS CONFIGURED TO OUTPUT VOICE GUIDANCE TO A USER DURING TRANSFER OF A JOB, AND METHOD FOR CONTROLLING IMAGE FORMING APPARATUS

The entire disclosure of Japanese Patent Application No. 2020-120410, filed on Jul. 14, 2020, is incorporated herein by reference in its entirety.

BACKGROUND

Technological Field

The present disclosure relates to an image forming system, an image forming apparatus, and a method for controlling an image forming apparatus.

Description of the Related Art

A technique has been proposed in which a job that has been set in a first image forming apparatus is taken over by a second image forming apparatus connected through a network. For example, Japanese Laid-Open Patent Publication No. 2019-191494 discloses an image forming apparatus that, when toner runs out in the middle of printing, transmits information on a job through a network to another image forming apparatus capable of taking over the job.

A technique has also been proposed for setting a job by voice, and indicating progress of a job by voice. For example, Japanese Laid-Open Patent Publication No. 11-39106 discloses an image forming apparatus that outputs a status of the image forming apparatus sensed by a sensor group by voice through a speaker.

SUMMARY

In an image forming; apparatus including both the job takeover function and the voice operation function described above, the voice operation also needs to be taken over by another image forming apparatus. However, no specific proposal has ever been made about a takeover of voice operation.

The present disclosure has been made in view of these circumstances, and has an object to provide an image forming apparatus that performs a takeover of a set job and a takeover of voice operation appropriately.

To achieve at least one of the abovementioned objects, according to an aspect of the present invention, an image forming system reflecting one aspect of the present invention includes a plurality of image forming apparatuses connected to one another through a network. Each of the plurality of image forming apparatuses includes a printer, a network interface, a microphone, a speaker, and a hardware processor. The printer prints an image in accordance with a set job. The network interface is communicatively connected to another image forming apparatus through the network. The microphone receives voice input from a user. The speaker outputs voice to the user. The hardware processor controls the printer. The hardware processor of a first image forming apparatus of the plurality of image forming apparatuses guides the user by voice on information about execution of the job, sets the job based on the voice input from the user, and when the job cannot be executed by the printer of the first image forming apparatus, transfers the set job to a second image forming apparatus of the plurality of image forming apparatuses. The hardware processor of the second image forming apparatus that has received the transfer of the set job takes over and performs the guidance for the user by voice.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of fine present invention will be described with reference M the drawings. However, the scope of the invention is not limited to the disclosed embodiments. Note that the same or corresponding pacts are designated by the same reference symbols and may not be described repeatedly.

In the following embodiments, an image forming apparatus may be arty one of a color printer, a monochrome printer, a copier, and a facsimile, or may be a multi-functional peripheral (so-called MFP) of these functions,

[Schematic Configuration of Image Forming Apparatus]

Figure 1:
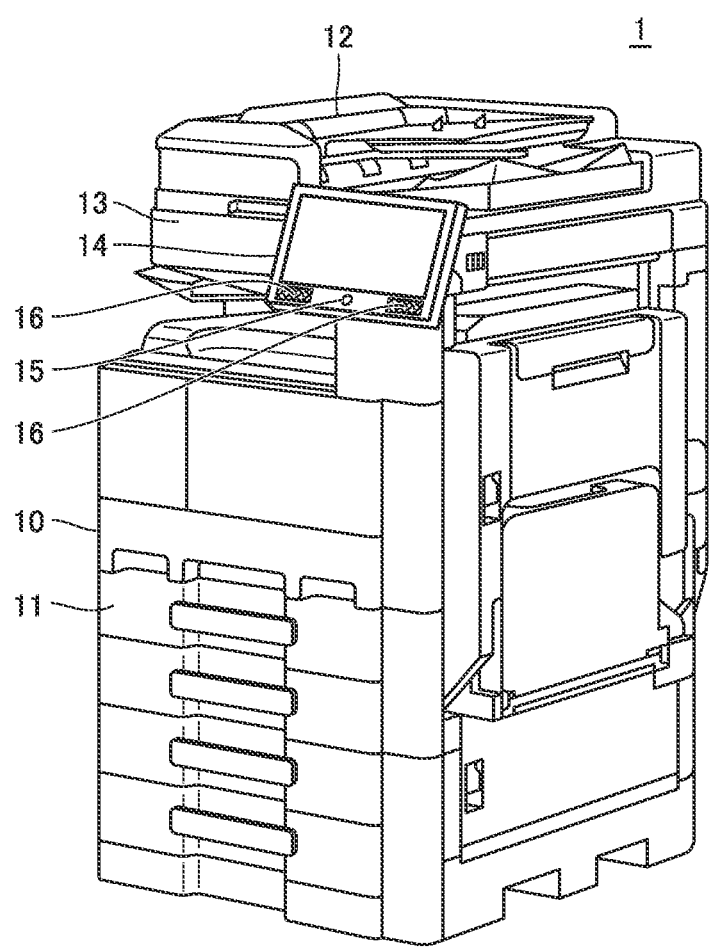
FIG. 1 is a diagram showing an external appearance example of an image forming apparatus.

FIG. 1 is a diagram showing an external appearance example, of an image forming apparatus. FIG. 1 illustrates an image forming apparatus 1 as an MFP.

Image forming apparatus 1 includes a printer 10 as an image forming unit, and a scanner 13. Printer 10 includes a paper feed tray 11 that stores sheets of paper. Scanner 13 includes an ADF (Auto Document Feeder) 12.

Image forming apparatus 1 further includes an operation panel 14 that displays objects and various types of information for various setting operations with regard to image forming apparatus 1. Operation panel 14 is further provided with a microphone 15 and a speaker 16. Operation panel 14 is disposed on the front side of image forming apparatus 1.

[Hardware Configuration of Image Forming Apparatus]

Figure 2:
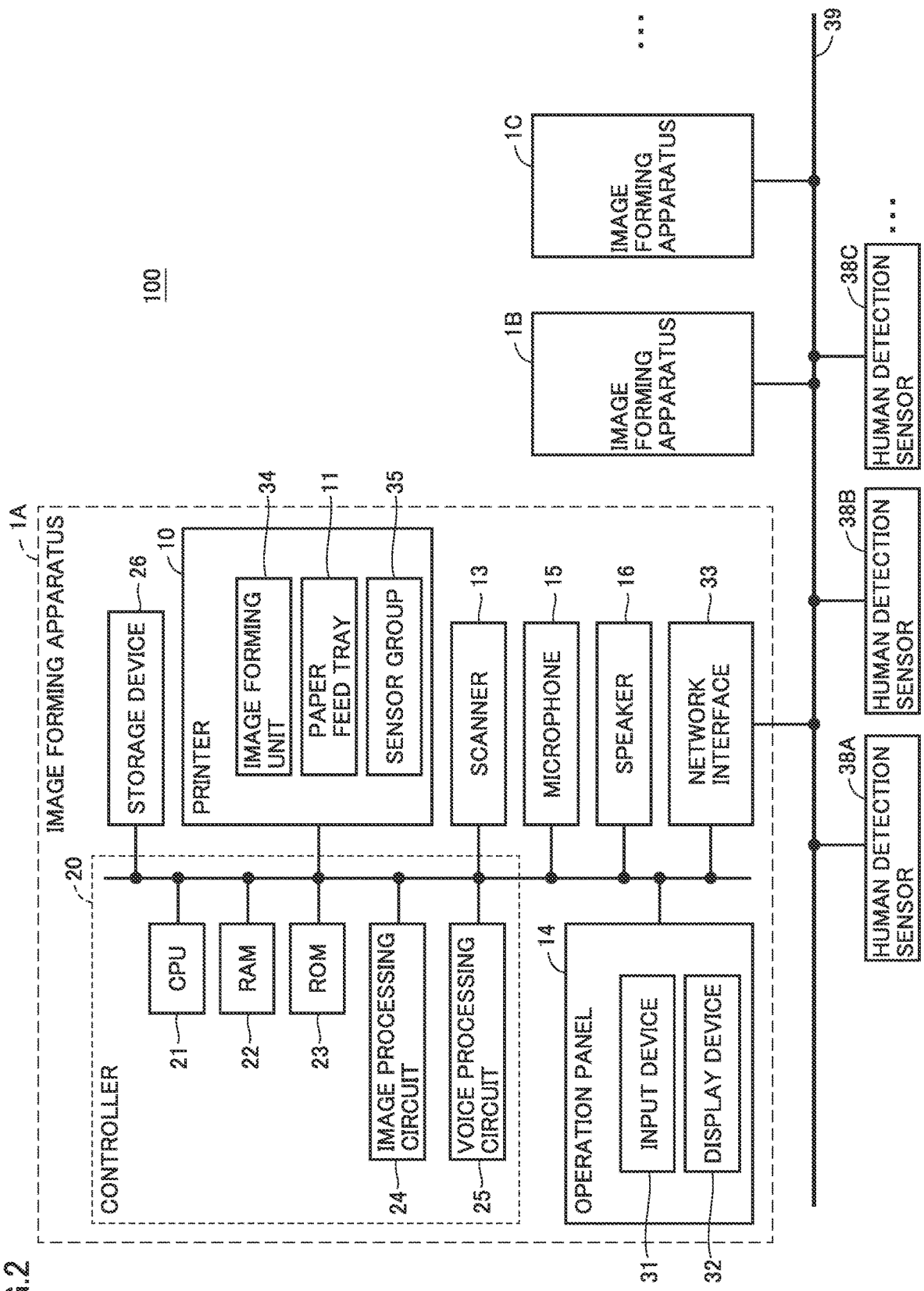
FIG. 2 is a block diagram showing a principal hardware configuration example of the image forming apparatus.

FIG. 2 is a block diagram showing a principal hardware configuration example of the image forming apparatus. FIG. 2 further shows a configuration of a system 100 including a plurality of image forming apparatuses 1A, 1B, 1C . . . communicatively connected to one another through a network 39. In the following description, image forming apparatuses 1A, 1B, 1C . . . are referred to collectively or non-specifically as image forming apparatus 1 because they have a similar configuration.

Referring to FIG. 2, image forming apparatus 1 includes, in addition to printer 10, scanner 13, operation panel 14, microphone 15, speaker 16 and printer 10, a controller 20 as a hardware processor, a storage device 26, and a network interface 33. Printer 10 includes, in addition to paper feed tray 11, an image forming unit 34 and a sensor group 35.

Image forming unit 34 forms, based on original image data, an image on a sheet of paper fed from paper feed tray 11. The original image data may be generated from an image optically read by scanner 13, or may be transferred from a terminal device (not shown) through network 39. The image may be formed with any process such as an electrophotographic process or an ink jet process, without particular limitation.

Sensor group 35 includes a plurality of sensors for sensing a status of image forming apparatus 1. For example, sensor group 35 includes a sensor for sensing the remaining amount of toner or ink, a sensor for sensing a paper size, a sensor for sensing the remaining amount of sheets, and the like.

Controller 20 is configured, in the example of FIG. 2, based on a computer including at least one CPU (Central Processing Unit) 21, at least one RAM (Random Access Memory) 22, and at least one ROM (Read Only Memoty) 23. Controller 20 may include an image processing circuit 24 which is an integrated circuit dedicated to image processing, and a voice processing circuit 25 which is an integrated circuit dedicated to voice processing. Alternatively, controller 20 may be configured to cause CPU 21 to perform the functions of image processing circuit 24 and voice processing circuit 25.

Controller 20 may be configured by at least one FPGA (Field Programmable Gate Array) or at least one ASIC (Application Specific integrated Circuit), instead of by at least one CPU 21. Alternatively, controller 20 may be configured by a combination of any of a CPU, an FPGA, and an ASIC. In the present disclosure, controller 20 is also referred to as a hardware processor.

Controller 20 controls operations of image forming apparatus 1 by executing various programs such as a control program for setting and adjusting control parameters of image forming apparatus 1. In response to receiving an instruction to execute the control program, controller 20 reads the control program from storage device 26 or ROM 23 into RAM 22. RAM 22 functions as a working memory and temporarily stores various types of data required for execution of the control program. The control program may be provided as stored in a non-transitory recording medium, or may be provided as data through network 39.

Network interface 33 exchanges data with network interfaces 33 of other image forming apparatuses 1, or with external communication equipment (not shown), through network 39. Network 39 may be wired or wireless. If the network is wireless, an antenna which is not shown is connected to network interface 33. The external communication equipment includes, for example, a portable communication terminal such as a smartphone, and a server. Image forming apparatus 1 may be configured to be able to download the control program from the server through network 39.

Operation panel 14 and microphone 15 form an operation receiving unit that receives an operation on image forming apparatus 1. Typically, operation panel 14 and microphone 15 receive a job to be executed by printer 10.

Operation panel 14 includes a touch panel (also referred to as a touch screen) formed by a touch pad as an input device 31 and a display as a display device 32. The touch pad receives an operation on image forming apparatus 1 through touch operation. Operation panel 14 may include, as input device 31, a hard button that receives an operation on image forming apparatus 1 through touch operation. The display as display device 32 provides various types of information to a user.

Microphone 15 is a voice input unit that receives an input of voice representing the contents of an operation on image forming apparatus 1. A voice signal received by microphone 15 is converted to voice data by voice processing circuit 25 of controller 20.

Speaker 16 is a voice output unit that outputs voice. The voice output from speaker 16 is generated by voice processing circuit 25 of controller 20.

Storage device 26 is, for example, a hard disk, an SSD (Solid State Drive), or another storage device. Storage device 26 stores a control program and the like according to the present embodiment. Note that the storage location of the control program is not limited to storage device 26, and the control program may be stored in a storage area (for example, a cache) of controller 20, ROM 23, RAM 22, external equipment (for example, a server), and the like.

The control program may be provided as incorporated into a part of an appropriate program, rather than as an individual program. In this case, control processing according to the present embodiment is implemented in cooperation with the appropriate program. Even such a program that does not include some of modules does not deviate from the gist of the control program according to the present embodiment.

Further, some or all of the functions provided by the control program may be implemented by dedicated hardware. Further, image forming apparatus 1 may be configured in such a manner as a cloud service in which at least one server executes some of the processing of the control program.

System 100 further includes one or more human detection sensors 38A, 38B, 38C, . . . for sensing a location and movement of the user. Human detection sensors 38A, 38B, 38C, . . . are connected to image forming apparatuses 1A, 1B, 1C . . . through network 39. Each image forming apparatus 1 receives results of sensing by human detection sensors 38A, 38B, 38C. Haman detection sensors 38A, 38B, 38C, . . . are referred to collectively or non-specifically as human detection sensor 38.

Human detection sensor 38 may be, for example, any one of an infrared sensor, an infrared array sensor, a millimeter-wave radar sensor, a submillimeter-wave radar sensor, and a video camera Human detection sensor 38 may be attached to the ceiling or wall of a room where image forming apparatus 1 has been installed, or may be attached to image forming apparatus 1.

[Functional Configuration of Image Forming Apparatus]

Figure 3:
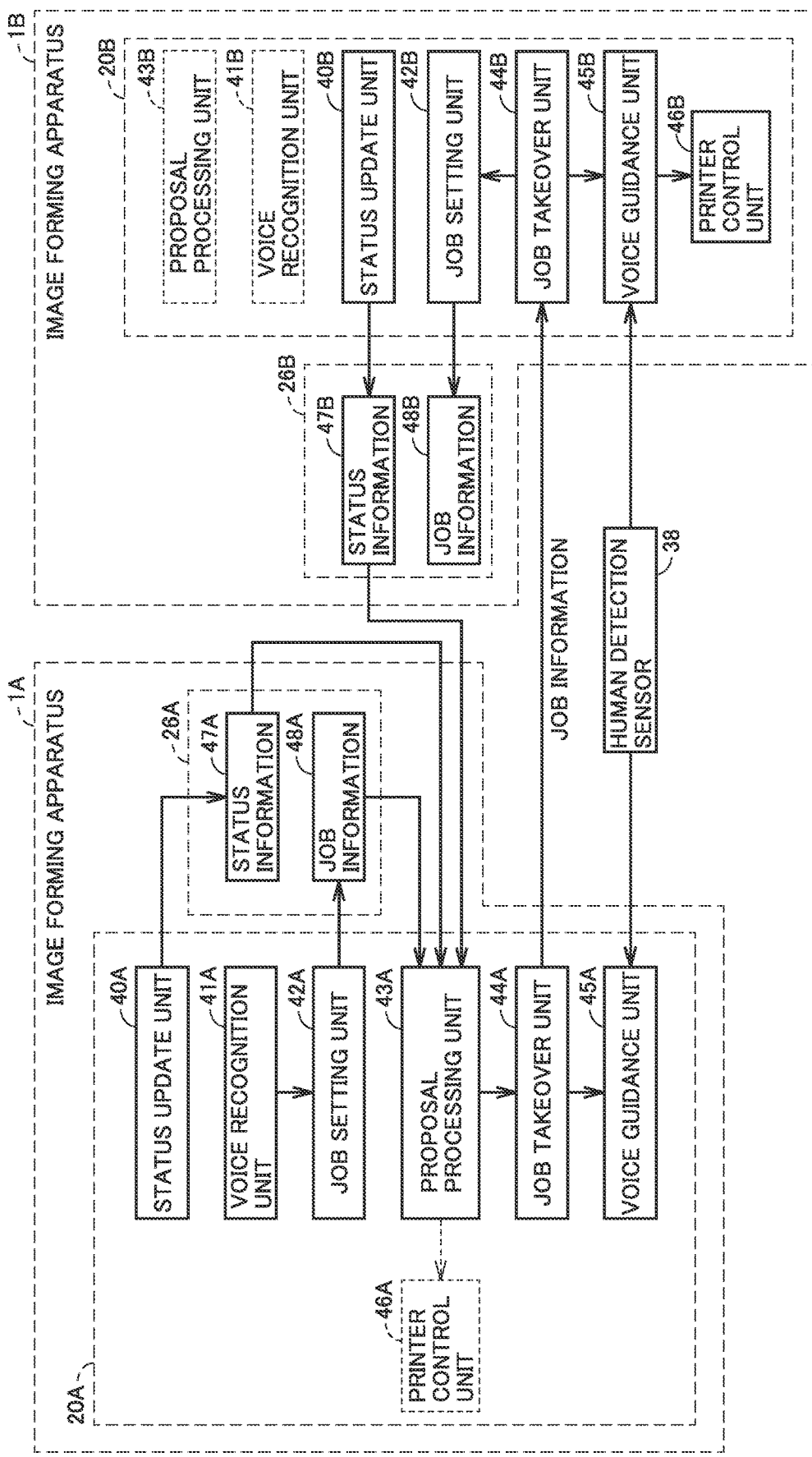
FIG. 3 is a block diagram showing a functional configuration example of controllers and storage devices of the image forming apparatuses.

FIG. 3 is a block diagram showing a functional configuration example of the controllers and the storage devices of the image forming apparatuses. In the following, operation of each functional element will be described with reference to an example where a set job is handed over from image forming apparatus 1A to image forming apparatus 1B. As shown in FIG. 3, each functional element included in image forming apparatus 1A is denoted by a reference symbol that ends with A, and each element included in image forming apparatus 1B is denoted by a reference symbol that ends with B.

Referring to FIG. 3. controllers 20A and 20B implement various functions by executing control programs stored in storage devices 26A and 26B, respectively. Each controller 20 of image forming apparatuses 1A and 1B includes a status update unit 40, a voice recognition unit 41, a job setting unit 42, a proposal processing unit 43, a job takeover unit 44, a voice guidance unit 45, and a printer control unit 46.

Each storage device 26 of image forming apparatuses 1A and 1B stores status information 47 and job information 48. Status information 47 indicates a current status of image forming apparatus 1 for a plurality of items, such as the remaining amount of toner or ink, and the size and the remaining amount of paper. Job information 48 is information about a job to be executed by printer 10, and indicates conditions for the job that have been set by the user.

Status update unit 40A monitors a detection signal that is output from sensor group 35 of image forming apparatus 1A, and based on a result of the monitoring, routinely updates status information 47A stored in storage device 26A, Similarly, status update unit 40B routinely updates, based on a detection signal that is output from sensor group 35 of image forming apparatus 1B, status information 47B stored in storage device 26B.

Voice recognition unit 41A converts voice data, which is based on voice received by microphone 15 of image forming apparatus 1A, to text data through voice recognition. The voice recognition is implemented with a known technique. Voice recognition unit 41A may be implemented, for example, by execution of a voice recognition program, or by image processing circuit 24 which is a circuit dedicated to voice recognition processing. The same applies to voice recognition unit 41B.

Job setting unit 42A sets conditions for a job to be executed by printer 10 of image forming apparatus 1A, and generates job information 48A representing the set conditions. Job setting unit 42A stores generated job information 48A in storage device 26A.

The conditions for the job include conditions for a plurality of items. Examples of the plurality of items include a paper size, the number of copies, two-sided/one-sided printing, page combination, an original size, the number of originals, a scaling, an image density, the type of color printing (full-color/two-color/monochrome), and an image quality. Note that the item "page combination" corresponds to a function of combining and copying a plurality of pages onto one side of paper. As a condition for the item "page combination" for example, "2 in 1" or "4 in 1" is set. Note that "2 in 1" means combining and copying two pages onto one side of paper, and "4 in 1" means combining and copying four pages onto one side of paper.

Job setting unit 42A sets the conditions for the job based on touch operation all operation panel 14 or voice input to microphone 15 in image forming apparatus 1A. Note that the conditions for all items are not input to operation panel 14 or microphone 15. In the case of a copy job, for example, the number of originals and the original size are obtained by execution of a scanning process, Thus, job setting unit 42A acquires data required to set the conditions for a job depending on the contents of the job. In the case of a copy job, for example, job setting unit 42A acquires data indicating the number of originals and the original size by executing a scanning, process. Based on the acquired data, job setting unit 42 sets the conditions for the item "number of originals" and the item "original size."

The conditions for the job may include an item requested by the user. For example, the user's request for a change to printing at an image forming apparatus capable of faster printing is also included in the conditions for the job.

Proposal processing unit 43A determines, based on the conditions for the job stored as job information 48A and status information 47A, whether or not the job can be executed in image fol ting apparatus 1A in the status indicated by status information 47A. When it is determined by proposal processing unit 43A that the job can be executed, printer control unit 46A causes printer 10 of image forming apparatus 1A to perform printing.

When it is determined that the job cannot be executed, on the other hand, proposal processing unit 43A searches for an image forming apparatus capable of executing the job by referring to status information 47 of other image forming apparatuses 1 connected through network 39. When it is determined as a result of the searching that the job can be executed by image forming apparatus 1B, proposal processing unit 43A proposes to the user a takeover of the job by image forming apparatus 1B by voice output or display on operation panel 14.

When the user agrees to the proposal of job takeover from proposal processing unit 43A, job takeover unit 44A transfers job information 48A from takeover-source image forming apparatus 1A to job takeover unit 44B of takeover-destination image forming apparatus 1B.

Job setting unit 42B of takeover-destination image forming apparatus 1B sets the conditions for the job based on job information 48A received from takeover-source image forming apparatus 1A. Job setting unit 42B stores the set conditions for the job in storage device 26B as job information 48B.

During setting of the conditions for the job by job setting unit 42A, voice guidance unit 45A guides the user by voice on information about the setting of the job. Further, during a takeover of the job, voice guidance units 45A and 45B guide the user, at appropriate timing based on the location information of the user sensed by human detection sensor 38, on the location of takeover-destination image forming apparatus 1B. For example, voice guidance units 45A and 45B perform a takeover of voice guidance, or change the volume, when movement of the user is sensed by human detection sensor 38.

Specifically, voice guidance units 45A and 45B perform a takeover of voice guidance when a voice guidance takeover condition is satisfied. Examples of the voice guidance takeover condition include:

(i) When movement of the user away from takeover-source image forming apparatus 1A (that is, movement out of a prescribed distance) is sensed;

(ii) When the user moves past an intermediate location between takeover-source image forming apparatus 1A and takeover-destination image forming apparatus 1B; and (iii) When the user reaches the vicinity (that is, comes within a prescribed distance) of takeover-destination image forming apparatus

[Procedure of Job Takeover and Voice Guidance Takeover]

Referring to the hardware configuration diagram of FIG. 2 and flowcharts of FIGS. 4 and 5, a procedure of job takeover and voice guidance takeover will now be described.

Figure 4:
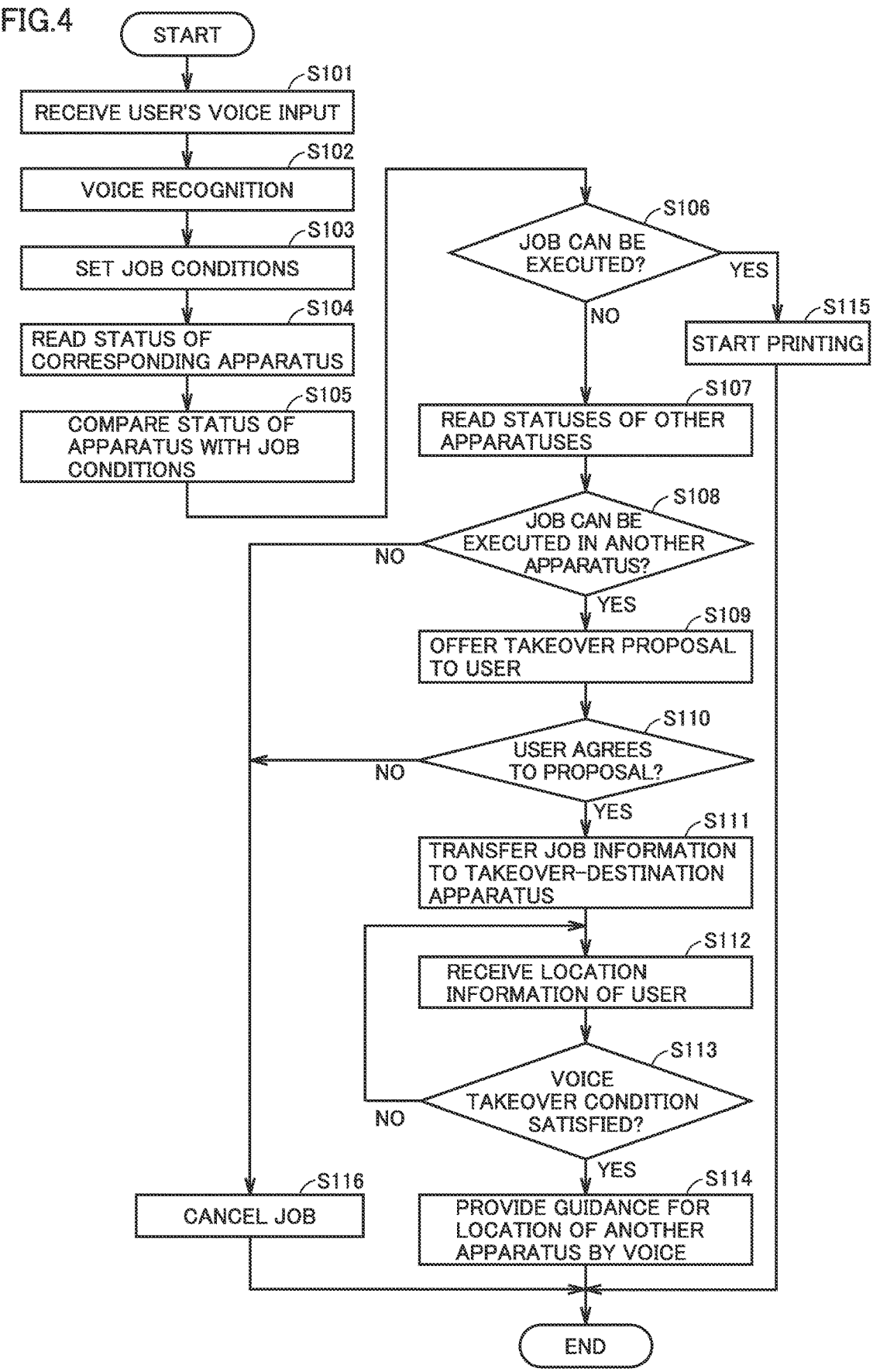
FIG. 4 is a flowchart showing a procedure of job takeover and voice guidance takeover performed by a takeover-source image forming apparatus.

FIG. 4 is a flowchart showing a procedure of job takeover and voice guidance takeover performed by a takeover-source image forming apparatus.

In step S101 of FIG. 4, controller 20 as a hardware processor receives the user's voice input th rough microphone 15.

In subsequent step S102, controller 20 converts input voice data to text data using a known voice recognition technique.

In subsequent step S103, controller 20 sets conditions for a job based on the converted text data, and generates job information 48 representing the set conditions. Controller 20 stores generated job information 48 in storage device 26.

In subsequent step S104, controller 20 reads status information 47 from storage device 26 in order to sense a status of its corresponding image forming apparatus.

In subsequent step S105, controller 20 compares the status of the corresponding image forming apparatus based on status information 47 with the conditions for the job. In subsequent step S106, controller 20 determines, based on a result of the comparison whether or not the job can be executed in the corresponding image forming apparatus.

When it is clear that the job cannot be executed from status information 47, for example, when the remaining amount of toner or ink is substantially zero, controller 20 determines that the job cannot be executed in step S106 without performing step S105. When it is clear that the job cannot be executed in the corresponding image forming apparatus from the conditions for the job, such as when the user has requested output from another image forming apparatus, controller 20 also determines that the job cannot be executed in step S106 without performing step S105.

When it is determined that the job can be executed in step S106 (YES in step S106), controller 20 moves the process to step S115. In step S115, controller 20 causes printer 10 to start printing.

When it is determined that the job cannot be executed in step S106 (NO in step S106), on the other hand, controller 20 moves the process to step S107. In step S107, controller 20 reads status information 47 of another image forming apparatus 1 through network 39.

In subsequent step S108, controller 20 determines whether or not the job can be executed in another image forming apparatus 1 by comparing the conditions for the job with a status of another image forming apparatus 1. When the job cannot be executed in another image forming apparatus 1 as a result of the comparison (NO in step S108), controller 20 cancels the job in step S116 and ends the process.

When the job can be executed in another image forming apparatus 1 (YES in step S108), controller 20 moves the process to step S109. In step S109, controller 20 offers a proposal of job takeover by another image forming apparatus 1 to the user by voice output or display on operation panel 14. When the user then does not agree to the proposal (NO in step S110), controller 20 cancels the job in step S116 and ends the process. The user may express his/her decision to agree or disagree to the proposal by voice input, or by pressing a button on operation panel 14.

When the user agrees to the proposal of job takeover by another image forming apparatus 1 (YES in step S110), on the other hand, controller 20 moves the process to step S111. In step S111, controller 20 transfers information on setting the job conditions, that is, job information 48, to takeover-destination image forming apparatus 1 through network 39. If the job has progressed halfway in takeover-source image forming apparatus 1, controller 20 also transmits information about a point of interruption of the job.

In subsequent step S112, controller 20 receives location information of the user from human detection sensor 38. In subsequent step S113, controller 20 determines whether or not the location information of the user satisfies a voice takeover condition. For example, controller 20 determines whether or not the user has started to move away from takeover-source image forming apparatus 1. When the voice takeover condition is not satisfied (NO in step S113), the process returns to step S112, where controller 20 receives the location information of the user again from human detection sensor 38.

When the voice takeover condition is satisfied (YES in step S113), in step S114, controller 20 guides the user on the location of takeover-destination image forming apparatus 1 by voice through speaker 16. The process of takeover-source image forming apparatus 1 is thus completed.

Figure 5:
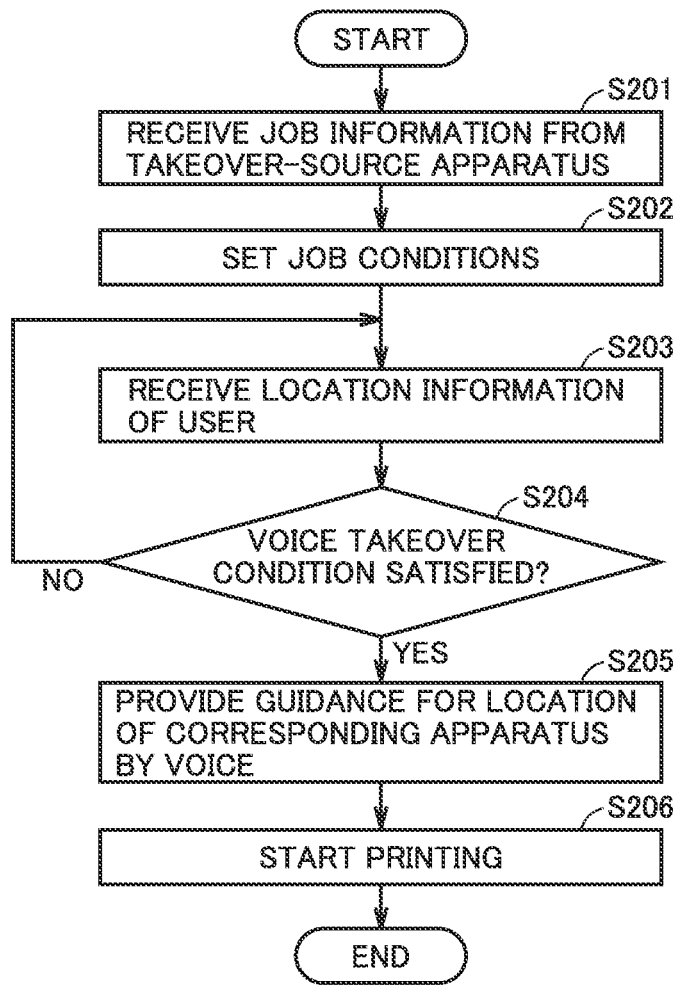
FIG. 5 is a flowchart showing a procedure of job takeover and voice guidance takeover performed by a takeover-destination image forming apparatus.

FIG. 5 is a flowchart showing a procedure of job takeover and voice guidance takeover performed by a takeover-destination image forming apparatus.

Referring to FIG. 5, first in step S201, controller 20 of takeover-destination image forming apparatus 1 receives information on setting the job conditions, that is, job information 48, from takeover-source image forming apparatus 1. If the job has progressed halfway in takeover-source image forming apparatus 1, controller 20 also receives information about a point of interruption of the job.

In subsequent step S202, controller 20 sets job conditions based on received job information 48. Controller 20 stores the set job conditions in storage device 26 as job information 48.

In subsequent step S203, controller 20 receives location information of the user from human detection sensor 38. In subsequent step S204, controller 20 determines whether or not the location information of the user satisfies a voice takeover condition. For example, controller 20 determines whether or not the user has reached the vicinity of takeover-destination image forming apparatus 1. When the voice takeover condition is not satisfied (NO in step S204), the process returns to step S203, where controller 20 receives the location information of the user again from human detection sensor 38.

When the voice takeover condition is satisfied (YES in step S204), in step S205, controller 20 guides the user on the location of takeover-destination image forming apparatus 1 by voice through speaker 16.

In subsequent step S206, controller 20 causes printer 10 to start printing on paper. Note that step S206 of starting printing can be performed at any time after the job conditions have been set in step S202. The process of takeover-destination image forming apparatus 1 is thus completed.

[Specific Process Examples]

Figure 6:
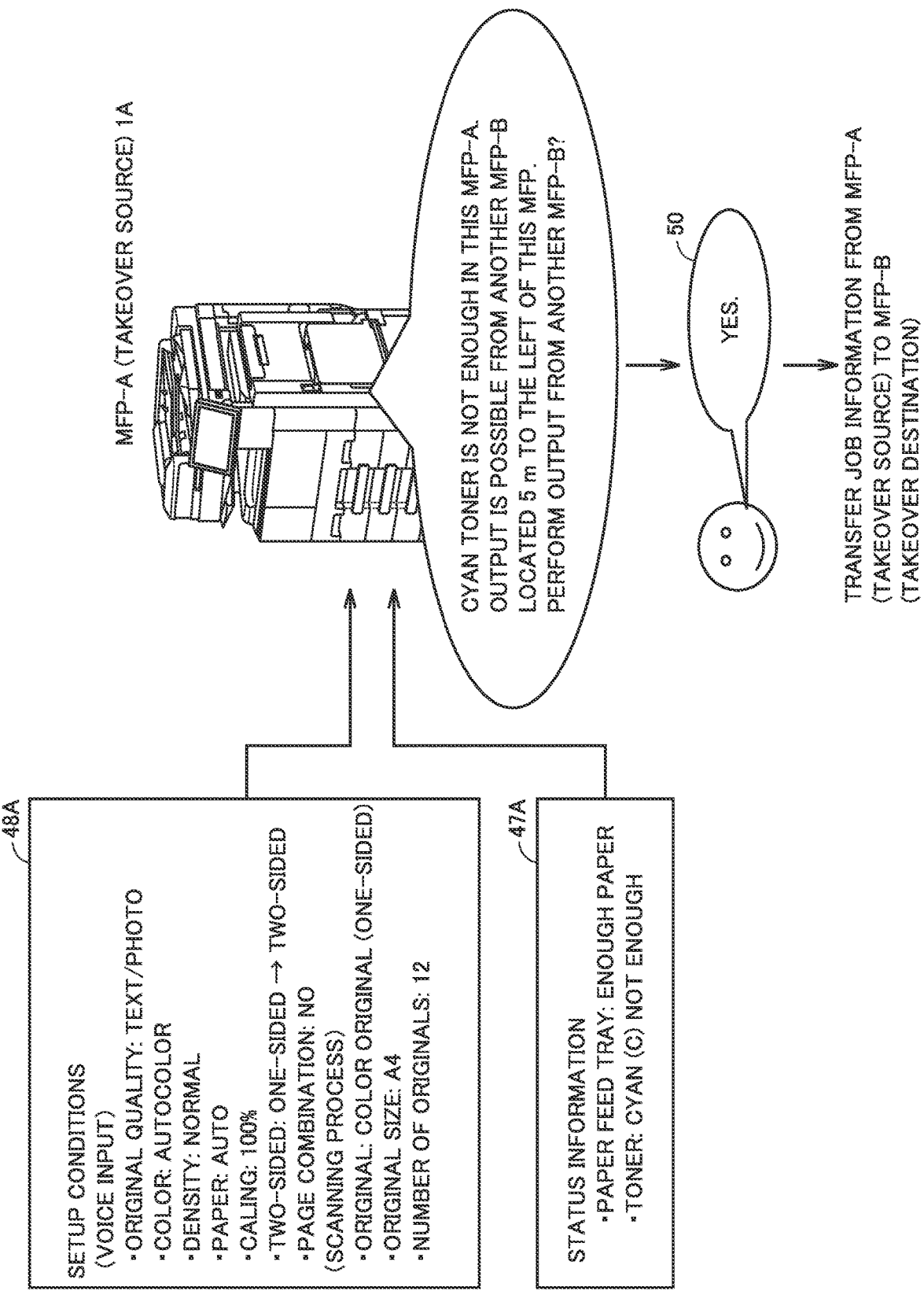
FIG. 6 is a diagram illustrating a specific example of a proposal of job takeover.
Figure 7:
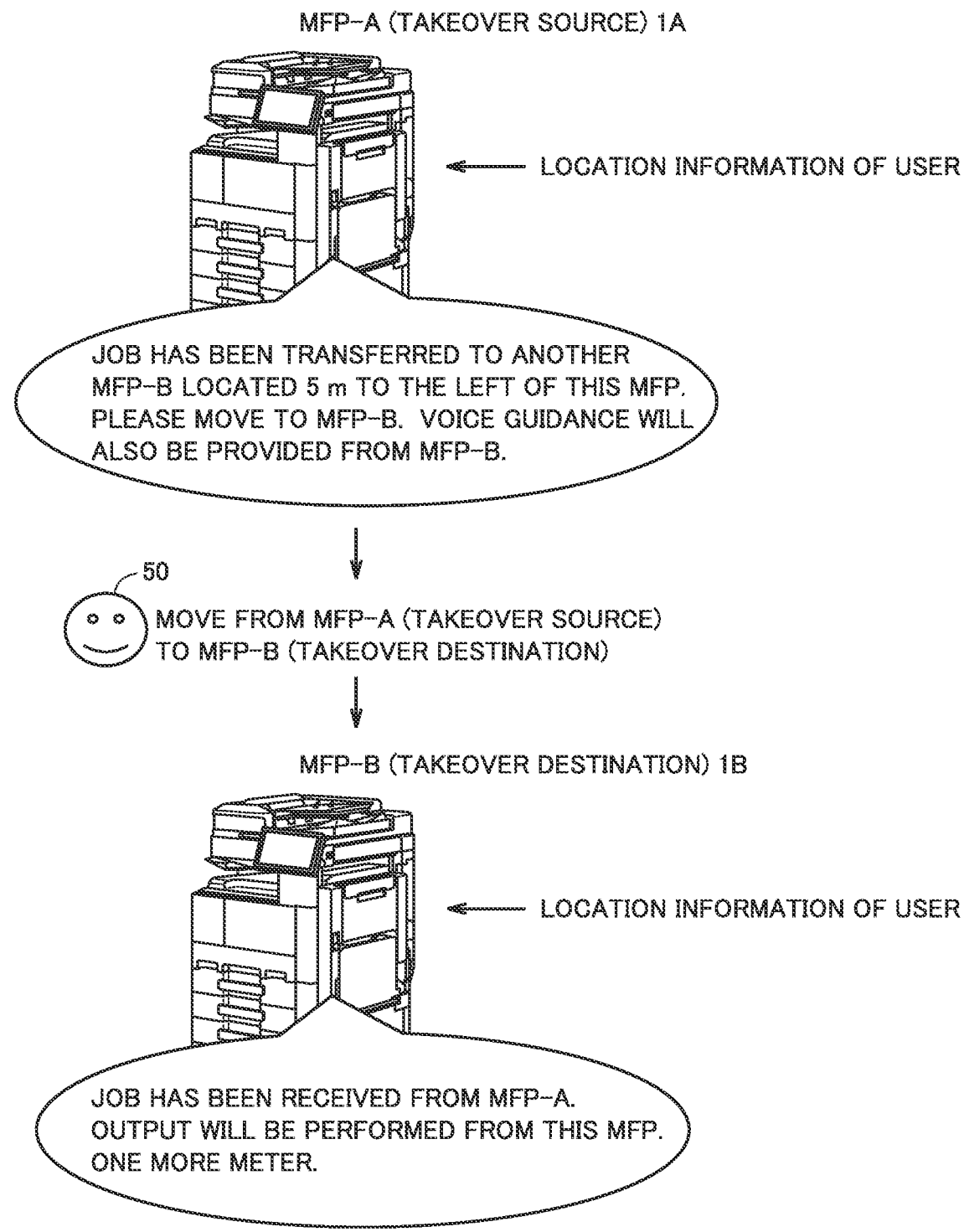
FIG. 7 is a diagram illustrating a specific example of voice takeover.

Referring to FIGS. 6 and 7, specific process examples will now be described. FIG. 6 is a diagram illustrating a specific example of a proposal of job takeover. FIG. 6 shows an example where a job is handed over from image forming apparatus 1A (also referred to as "MFP-A") to image forming apparatus 1B (also referred to as "RMP-B").

As shown in FIG. 6, controller 20A of takeover-source image forming apparatus 1A sets, as conditions for a job, "PAPER: AUTO," "SCALING: 100%," "ONE-SIDED/TWO-SIDED PRINTING: ONE-SIDED→TWO-SIDED," "PAGE COMBINATION: NO" and the like, through voice recognition of voice data that has been input to microphone 15, Note that "ONE-SIDED/TWO-SIDED PRINTING; ONE-SIDED→TWO-SIDED" indicates that images on a plurality of pages read from originals having images formed only on one side thereof are copied onto both sides of paper. Further, controller 20A sets, as conditions for a job, "ORIGINAL: COLOR ORIGINAL (ONE-SIDED)," "ORIGINAL SIZE: A4," "NUMBER OF ORIGINALS: 12" and the like, by executing a scanning process. Controller 20 generates job information 48A indicating the set conditions.

Controller 20A determines, based on the conditions set for the job and status information 47A, whether or not the job can be executed. For example, when the remaining amount of sheets stored in A4 paper feed tray is higher than the number of originals, controller 20 determines that the remaining amount of sheets is enough. Further, controller 20 determines whether or not the remaining amount of toner in a toner cartridge for each of the colors of black (K), yellow (Y), cyan (C) and magenta (M) is enough for color printing of twelve originals. As a result, in the example of FIG. 6, controller 20A determines that the toner of cyan (C) is not enough.

Controller 20A searches for another image forming apparatus 1 capable of executing the job by referring to status information 47 of other image forming apparatuses 1 connected through network 39. When it is determined as a result of the searching that the job can be executed by image forming apparatus 1B, controller 20A proposes to a user 50 a takeover of the job by image forming apparatus 1B by voice output. Specifically, controller 20A outputs "Cyan toner is not enough in this MFP-A. Output is possible from another MFP-B located 5 m to the left of this MFP. Perform output from another MFP-B?" by voice.

When user 50 inputs "YES" by voice in response to this proposal of job takeover, controller 20A of image forming apparatus 1A determines that the voice input from user 50 is an agreement to the proposal of takeover through voice recognition. In response to the agreement by user 50, controller 20A transfers job information 48, which is information on setting the job conditions, from takeover-source image forming apparatus 1A to takeover-destination image forming apparatus 1B through network 39.

FIG. 7 is a diagram illustrating a specific example of voice takeover. Referring to FIG. 7, controller 20A of takeover-source image forming apparatus 1A guides user 50 by voice, at appropriate timing based on the location information of user 50 received from human detection sensor 38, on the location of takeover-destination image forming apparatus 1B. For example, when user 50 starts to move away from image forming apparatus 1A, controller 20A outputs "Job has been transferred to another MFP-B located 5 m to the left of this MFP. Please move to MFP-B. Voice guidance will also be provided from MFP-B." by voice.

User 50 moves from takeover-source image forming apparatus to to takeover-destination image forming apparatus 1B. Controller 20B of takeover-destination image forming apparatus 1B guides user 50 by voice, at appropriate timing based on the location information of user 50 received from human detection sensor 38, on the location of takeover-destination image forming apparatus 1B. For example, when user 50 reaches the vicinity of image forming apparatus 1B, controller 20B outputs "Job has been received from MFP-A. Output will be performed from this MFP. One more meter." by voice.

[Effects of Embodiments]

According to the embodiments described above, an image forming apparatus is provided nl which, when a job cannot be executed in this image forming apparatus, the job is taken over and voice guidance is also taken over by another image forming apparatus. The takeover-destination image forming apparatus can perform the takeover of voice guidance at appropriate timing by starting the voice guidance based on location information of a user.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising a plurality of image forming apparatuses connected to one another through a network,
   each of the plurality of image forming apparatuses including:
      a printer that prints an image in accordance with a set job;
      a network interface for communicative connection to another image forming apparatus through the network;
      a microphone for receiving voice input from a user;
      a speaker for outputting voice to the user; and
      a hardware processor that controls the printer,
   wherein:
   the hardware processor of a first image forming apparatus of the plurality of image forming apparatuses guides the user by voice on information about execution of the job, sets the job based on the voice input from the user, and when the job cannot be executed by the printer of the first image forming apparatus, transfers the set job to a second image forming apparatus of the plurality of image forming apparatuses,
   the hardware processor of the second image forming apparatus that has received the transfer of the set job takes over and performs the guidance for the user by voice, and
   the hardware processor of the second image forming apparatus guides the user by voice on a location of the second image forming apparatus.

2. The image forming system according to claim 1, wherein the hardware processor of the second image forming apparatus starts the guidance for the user by voice after receiving the job set in the first image forming apparatus.

3. The image forming system according to claim 1, wherein the hardware processor of the second image forming apparatus starts the guidance for the user by voice when a location of the user satisfies a predetermined condition.

4. The image forming system according to claim 3, wherein the predetermined condition is when movement of the user from the first image forming apparatus to the second image forming apparatus is sensed.

5. The image forming system according to claim 3, wherein the predetermined condition is when movement of the user away from the first image forming apparatus is sensed.

6. The image forming system according to claim 3, wherein the predetermined condition is when the user reaches an intermediate location between the first image forming apparatus and the second image forming apparatus.

7. The image forming system according to claim 3, wherein the predetermined condition is when the user comes within a predetermined range from the second image forming apparatus.

8. The image forming system according to claim 1, wherein:
   each of the plurality of image forming apparatuses further includes a storage device that stores a status of a corresponding image forming apparatus as status information,
   the hardware processor of each of the plurality of image forming apparatuses updates the status information based on a detected value from a sensor group provided on the corresponding image forming apparatus, and the hardware processor of the first image forming apparatus determines whether or not the job can be executed based on the updated status information, and when the job cannot be executed, proposes to the user a takeover of the job by another one of the plurality of image forming apparatuses.

9. An image forming apparatus comprising:
a printer that prints an image in accordance with a set job;
a network interface for communicative connection to one or more other image forming apparatuses through a network;
a microphone for receiving voice input from a user;
a speaker for outputting voice to the user; and
a hardware processor that controls the printer,
wherein:
the hardware processor guides the user by voice on information about execution of the job, sets the job based on the voice input from the user, and when the job cannot be executed by the printer, transfers the set job to a takeover-destination image forming apparatus of the one or more other image forming apparatuses, and
when the hardware processor receives, from a takeover-source image forming apparatus of the one or more other image forming apparatuses, a transfer of a job set in the takeover-source image forming apparatus, the hardware processor takes over and performs the guidance for the user by voice including guidance by voice on a location of the image forming apparatus.

10. A method for controlling a plurality of image forming apparatuses connected to one another through a network,
each of the plurality of image forming apparatuses including:
a printer that prints an image in accordance with a set job;
a network interface for communicative connection to another image forming apparatus through the network;
a microphone for receiving voice input from a user;
a speaker for outputting voice to the user; and
a hardware processor that controls the printer, and
the method comprising:
by the hardware processor of a first image forming apparatus of the plurality of image forming apparatuses, guiding the user on information about execution of the job by voice through the speaker of the first image forming apparatus;
by the hardware processor of the first image forming apparatus, setting the job based on the voice input through the microphone of the first image forming apparatus;
by the hardware processor of the first image forming apparatus, when the job cannot be executed by the printer of the first image forming apparatus, transferring the set job to a second image forming apparatus of the plurality of image forming apparatuses through the network; and
by the hardware processor of the second image forming apparatus that has received the transfer of the set job, taking over and performing the guidance for the user by voice,
wherein the taking over and performing the guidance for the user by voice includes guiding the user by voice on a location of the second image forming apparatus.

11. The method according to claim 10, wherein the guiding the user by voice on the location of the second image forming apparatus is started after the job set in the first image forming apparatus is received.

12. The method according to claim 10, wherein the guiding the user by voice on the location of the second image forming apparatus is started when a location of the user satisfies a predetermined condition.

13. The method according to claim 12, wherein the predetermined condition is when movement of the user from the first image forming apparatus to the second image forming apparatus is sensed.

14. The method according to claim 12, wherein the predetermined condition is when movement of the user away from the first image forming apparatus is sensed.

15. The method according to claim 12, wherein the predetermined condition is when the user reaches an intermediate location between the first image forming apparatus and the second image forming apparatus.

16. The method according to claim 12, wherein the predetermined condition is when the user comes within a predetermined range from the second image forming apparatus.

17. The method according to claim 10, further comprising:
by the hardware processor of the first image forming apparatus, storing a status of the first image forming apparatus in a storage device as status information;
by the hardware processor of the first image forming apparatus, updating the status information based on a detected value from a sensor group provided on the first image forming apparatus; and
by the hardware processor of the first image forming apparatus, determining whether or not the job can be executed based on the updated status information, and when the job cannot be executed, proposing to the user a takeover of the job by another one of the plurality of image forming apparatuses.

* * * * *